March 28, 1961 V. H. SIEGEL 2,977,584
ENGINE NOISE GENERATOR
Filed March 1, 1957 2 Sheets-Sheet 1

INVENTOR.
VERNON H. SIEGEL
BY
ATTORNEYS

March 28, 1961 — V. H. SIEGEL — 2,977,584
ENGINE NOISE GENERATOR
Filed March 1, 1957 — 2 Sheets-Sheet 2

INVENTOR.
VERNON H. SIEGEL
BY
ATTORNEYS

United States Patent Office 2,977,584
Patented Mar. 28, 1961

2,977,584
ENGINE NOISE GENERATOR
Vernon H. Siegel, Buffalo, N.Y., assignor, by mesne assignments, to the United States of America as represented by the Secretary of the Navy
Filed Mar. 1, 1957, Ser. No. 643,483
1 Claim. (Cl. 340—384)

This invention relates to noise-generating equipment and especially to an electro-mechanical device capable of simulating the type of noise emitted from engines, such as aircraft engines.

The modern method of training flying personnel is to utilize synthetic training devices which simulate an actual operational aircraft. The students practice operational procedures, manipulate the controls and become thoroughly acquainted with the aircraft without ever having left the ground.

The ultimate aim in the design of these synthetic training devices is to produce equipment which faithfully simulates every detail of the operational aircraft which the students are learning to fly, so that training is received under conditions reproducing actual flight conditions to the maximum possible extent. Thus, it is desirable that the students be exposed to noise similar in type and volume to that which is produced by the operational aircraft.

The present invention simulates the noise output of an engine by utilizing the spokes of a rotating wheel to interrupt a beam of light which is directed upon a photoelectric cell. The output of the cell is amplified and converted into sound by a transducer.

The spacing and/or size of the spokes is made variable to provide control over the aural character of the generated noise.

An object of this invention is to synthetically generate noise simulating the noise produced by an engine.

Another object is to vary the characteristics of an engine-noise-producing device having an output which simulates that of an aircraft engine, so that the outputs of various types of engines may be simulated.

Other objects and many of the attendant advantages of this invention will be readily appreciated as the same becomes better understood by reference to the following detailed description when considered in connection with the accompanying drawings wherein.

Figure 1:
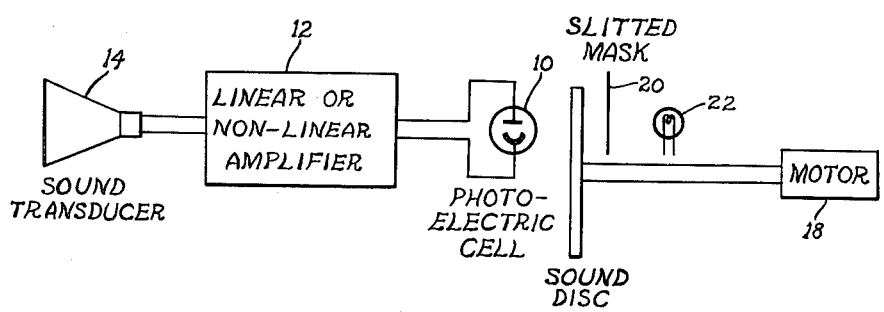
Fig. 1 is a partially blocked schematic diagram of the invention.

A photo-electric cell 10 is electrically connected to a conventional electronic amplifier 12, which may be of the linear or non-linear type. The output of the amplifier is connected to a sound transducer 14, which may be a loud-speaker.

A sound disc 16 is located directly in front of the photo-electric cell 10. The sound disc 16 is affixed to one end of the shaft of a motor 18.

A mask 20 containing a slit and a source of light 22 are positioned on the other side of the sound disc 16, so that the source of light 22, the slit in the mask 20, the apertures between the spokes of the sound disc 16 and the photo-electric cell 10 are optically aligned.

The mask 20 may be fabricated of any suitable material such as wood, metal, cardboard, etc. It is formed with a narrow slit therethrough and should be of sufficient dimension to completely shield the photo-electric cell 10 from any light rays coming from the source of light 22, except those coming through the slit. The source of light 22 may be any convenient source, such as an incandescent bulb.

Figure 2:
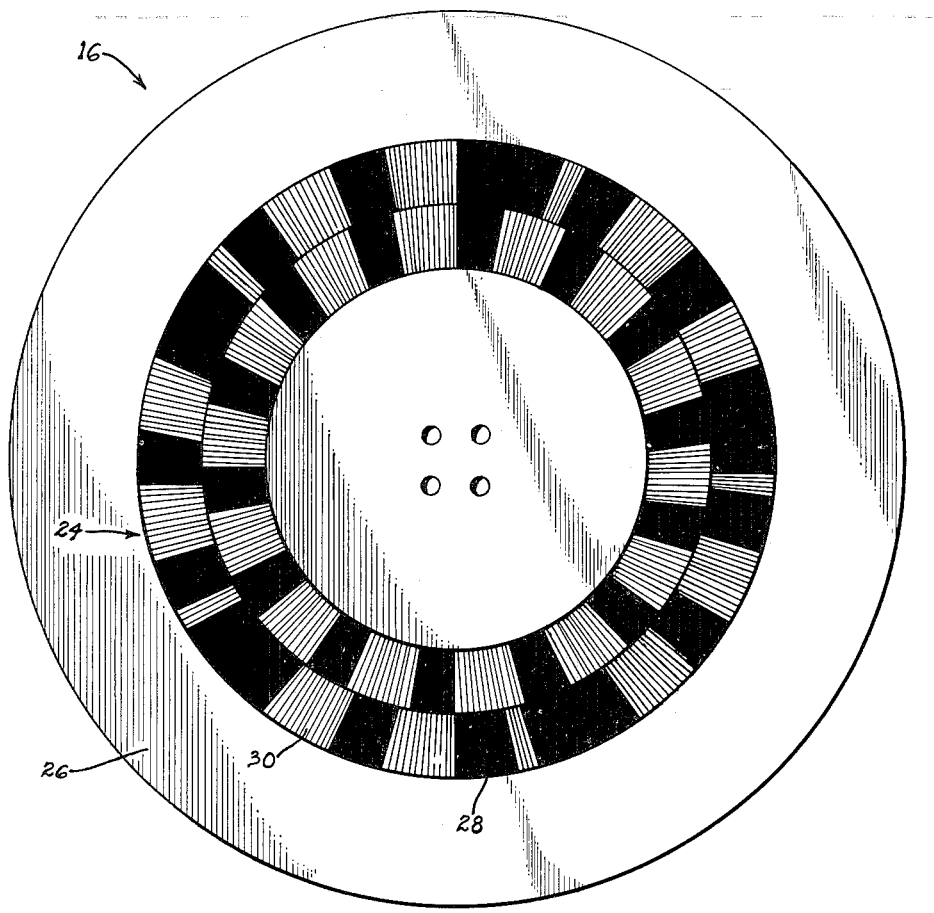
Fig. 2 is a front view of a preferred sound disc employed in the invention.

The sound disc 16, shown in more detail in Fig. 2, may be a disc formed from a film transparency containing the image of a spoked wheel or it may be a wheel fabricated of a suitable material, such as wood, plastic, etc., and containing spokes of various thicknesses. The number of spokes, their thicknesses and their arrangement around the wheel determines the distinctive aural quality of the noise output of the invention. For the purposes of this patent specification, the spokes are defined as including both the lines 30 and the wedges 28 seen in the film transparency 24 shown in Fig. 2.

The preferred type of disc as shown in Fig. 2 comprises a film transparency sandwich consisting of a film transparency 24 sandwiched between a pair of disc-shaped transparent covers 26 which are cemented together. The cover discs may be fabricated from acrylic plastic, for example.

The particular transparency illustrated simulates the noise of a specific type of helicopter engine. It contains two rings of opaque markings—an outer ring consisting of fifteen wedges 28 in series of three, two being 10° and the third 20° in width; and an inner ring consisting of fourteen equally spaced wedges 10° in width.

The outer and inner rings contain, in addition to the wedges, intermediary opaque lines 30 spaced at 1° and 1½° intervals, respectively.

A different sound disc may be employed for each simulated engine or a single variable disc may be utilized to simulate many different engines.

Figure 3:
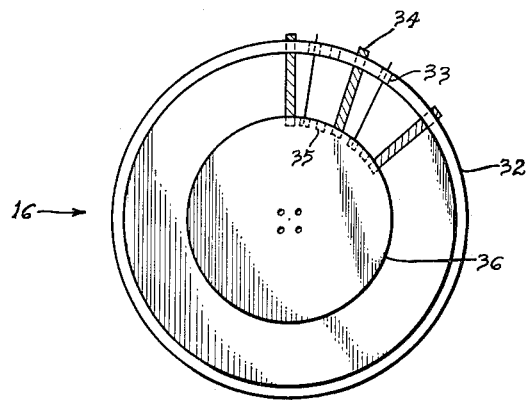
Fig. 3 is a front view of a variable sound disc, only a small number of the spokes being shown.

One simple example of a variable disc is shown in Fig. 3. Here a peripheral band 32 contains a series of spaced apertures 33 through which spokes 34 are inserted. The ends of the spokes 34 fit into slots 35 cut into the hub 36 of the wheel 16. The peripheral ends of the spokes extend through the peripheral band 32. Each spoke is kept firmly in place by inward pressure exerted upon its end by a spring-biased lever (not shown) mounted upon the band 32. The holes are large enough to accommodate the thickest spoke to be employed. Thus, the sizes, number and arrangement of the spokes may be varied as required.

Any other suitable arrangement for varying the sizes, spacing and arrangement of the spokes may be utilized.

In operation, the light shining upon the photo-electric cell 10 through the slit in the mask 20 is interrupted by the opaque spokes 28 and 30 in the film transparency (or the spokes 34 in the wheel) of the sound disc 16 which is rotated by the motor 18. The output of the photo-electric cell 10 is a series of pulses corresponding to the spaces between the spokes. The pulses are amplified by the electronic amplifier 12 and converted into noise by the loudspeaker 14.

The aural character of the noise may also be varied by employing a non-linear amplifier having externally manipulable controls for varying its linearity characteristics.

The amplifier may also employ positive feedback to obtain a slight oscillatory build-up in simulation of the swish of the rotor blades of a helicopter, if the noise of this type of aircraft engine is being simulated.

The above types of amplifier are well known in the electronic art and require no further discussion here.

Obviously many modifications and variations of the present invention are possible in the light of the above teachings. It is therefore to be understood that within the scope of the appended claim the invention may be practiced otherwise than as specifically described.

I claim:

In combination with a noise generator, means for reproducing a variety of sequential electrical impulses comprising a first ring having apertures therein, a hub ring concentric with said first ring and of substantially smaller diameter, said hub ring having apertures therein, said hub ring apertures being spacially aligned with said first ring apertures, and spokes connected between said first and hub rings and slidably retained in pairs of aligned apertures, said spokes when aligned in a particular arrangement and rotated, producing a patter of sequential electrical impulses which actuate the noise generator in conformance with said particular arrangement of spokes.

References Cited in the file of this patent

UNITED STATES PATENTS

| | | |
|---|---|---|
| 1,218,324 | Severy | Mar. 6, 1917 |
| 1,369,764 | Van Der Bijl | Feb. 22, 1921 |
| 2,432,123 | Potter | Dec. 9, 1947 |
| 2,459,860 | Wilkenson | Jan. 25, 1949 |
| 2,588,680 | Williams | Mar. 11, 1952 |
| 2,659,828 | Elliot | Nov. 17, 1953 |

FOREIGN PATENTS

| | | |
|---|---|---|
| 855,848 | France | May 21, 1940 |
| 656,060 | Great Britain | Aug. 8, 1951 |

OTHER REFERENCES

"Electronics," September 1946, pages 93, 94 and 95.
"Electronics," August 1945, pages 96–99 "Motor Noise Unit."